US012596221B2

(12) United States Patent
Fujisawa et al.

(10) Patent No.: US 12,596,221 B2
(45) Date of Patent: Apr. 7, 2026

(54) DISPLAY DEVICE BACKLIGHT WITH LASER SOURCE AND LIGHT GUIDE PLATE HAVING CURVED SURFACE LINE SECTIONS

(71) Applicant: Magnolia White Corporation, Tokyo (JP)

(72) Inventors: Koji Fujisawa, Tokyo (JP); Ken Kagabu, Tokyo (JP); Koichi Okuda, Tokyo (JP); Hiroaki Kijima, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 0 days.

(21) Appl. No.: 18/938,344

(22) Filed: Nov. 6, 2024

(65) Prior Publication Data

US 2025/0172736 A1     May 29, 2025

(30) Foreign Application Priority Data

Nov. 27, 2023     (JP) ................................. 2023-199703

(51) Int. Cl.
*F21V 8/00* (2006.01)
*G02F 1/13357* (2006.01)

(52) U.S. Cl.
CPC ......... *G02B 6/0046* (2013.01); *G02B 6/0055* (2013.01); *G02B 6/0068* (2013.01); *G02B 6/0091* (2013.01); *G02F 1/133615* (2013.01)

(58) Field of Classification Search
CPC .. G02B 6/0046; G02B 6/0038; G02B 6/0036; G02B 6/0055; G02B 6/0035; G02B 6/0068; G02B 6/005; G02F 1/133615
See application file for complete search history.

(56) References Cited

U.S. PATENT DOCUMENTS

| | | | | |
|---|---|---|---|---|
| 7,572,045 B2 * | 8/2009 | Hoelen | ................ | G02B 6/0046 |
| | | | | 362/624 |
| 7,604,387 B2 * | 10/2009 | Liu | ....................... | G02B 6/0046 |
| | | | | 362/621 |
| 7,901,125 B2 * | 3/2011 | Iwasaki | ................ | G02B 6/0046 |
| | | | | 362/628 |
| 8,029,181 B2 * | 10/2011 | Travis | ................ | G02B 19/0061 |
| | | | | 362/558 |
| 9,383,497 B2 * | 7/2016 | Liu | ....................... | G02B 6/002 |

(Continued)

FOREIGN PATENT DOCUMENTS

JP          2011-238484 A      11/2011

*Primary Examiner* — Ismael Negron
(74) *Attorney, Agent, or Firm* — XSENSUS LLP

(57) ABSTRACT

A backlight includes a light guide plate, a laser, and a reflector. The laser light incident on the first end face is reflected off the front surface, the rear surface, and the reflector, propagates inside the light guide plate, and exits from the front surface. The front surface has line sections each in a protruding or recessed shape in a region where the laser light is reflected. The line sections extend in a first direction between the first end face and the second end face, and are adjacent in a second direction perpendicular to the first direction. Each of the line sections has a curved surface formed by moving a straight line, parallel to an axis extending in the first direction, around the axis. An adjacent pair of the line sections has respective tips in the first direction that are not aligned with each other.

6 Claims, 13 Drawing Sheets

(56) References Cited

U.S. PATENT DOCUMENTS

| | | | | |
|---|---|---|---|---|
| 9,678,267 | B2 * | 6/2017 | Robinson ............. | G02B 6/0048 |
| 10,241,255 | B2 * | 3/2019 | Zha ...................... | G02B 6/0048 |
| 2013/0335821 | A1 * | 12/2013 | Robinson ............. | G02B 6/0068 |
| | | | | 359/464 |

* cited by examiner

116

D2

D1

DISPLAY DEVICE BACKLIGHT WITH LASER SOURCE AND LIGHT GUIDE PLATE HAVING CURVED SURFACE LINE SECTIONS

CROSS-REFERENCE TO RELATED APPLICATION

The present application claims priority from Japanese patent application JP2023-199703 filed on Nov. 27, 2023, the contents of which are hereby incorporated by reference into this application.

BACKGROUND

1. Field

This disclosure relates to a backlight and a display device.

2. Description of the Related Art

An edge-lit backlight using a laser as a light source cannot reflect light upward near the light source due to the high directionality of the light, resulting in the surface-emitting area being away from the light source. To address this, two light guide plates are used, with lasers arranged on mutually opposite sides (JP 2011-238484 A). Alternatively, in a backlight using a wedge-shaped light guide plate, where the thicknesses of both end faces differ and the lower surface slopes, the light incident on one end face is reflected off another end face, and the returning light is then reflected off the lower surface and directed upwards.

Due to the high directionality of the light, a striped pattern (streak-like luminance non-uniformity) along the direction of light propagation may be visible in the backlight. To prevent the luminance non-uniformity, it is desirable to avoid occurrence of different luminance non-uniformity.

SUMMARY

This disclosure aims to eliminate luminance non-uniformity.

A backlight includes: a light guide plate having a front surface and a rear surface, the light guide plate having a first end face connecting one end of the front surface and one end of the rear surface, the light guide plate having a second end face connecting another end of the front surface and another end of the rear surface, a thickness between the front surface and the rear surface being greater at the second end face than at the first end face, the rear surface sloping relative to the front surface; a laser capable of emitting laser light toward the first end face of the light guide plate; and a reflector facing the second end face, the laser light incident on the first end face being reflected off the front surface, the rear surface, and the reflector, propagating inside the light guide plate, and exiting from the front surface, the front surface having line sections each in a protruding shape or a recessed shape in a region where the laser light is reflected, the line sections extending in a first direction that is a direction between the first end face and the second end face, and being adjacent in a second direction perpendicular to the first direction, each of the line sections having a curved surface formed by moving a straight line, parallel to an axis extending in the first direction, around the axis, an adjacent pair of the line sections having respective tips in the first direction that are not aligned with each other.

A backlight includes: a light guide plate having a front surface and a rear surface, the light guide plate having a first end face connecting one end of the front surface and one end of the rear surface, the light guide plate having a second end face connecting another end of the front surface and another end of the rear surface, a thickness between the front surface and the rear surface being greater at the second end face than at the first end face, the rear surface sloping relative to the front surface; a laser capable of emitting laser light toward the first end face of the light guide plate; and a reflector facing the second end face, the laser light incident on the first end face being reflected off the front surface, the rear surface, and the reflector, propagating inside the light guide plate, and exiting from the front surface, the front surface having line sections each in a protruding shape or a recessed shape in a region where the laser light is reflected, the line sections extending in a first direction that is a direction between the first end face and the second end face, and being adjacent in a second direction perpendicular to the first direction, each of the line sections having a curved surface formed by moving a straight line, parallel to an axis extending in the first direction, around the axis, each of the line sections having an end portion that tapers.

A display device includes: the backlight; and a display panel arranged facing the front surface of the light guide plate.

DETAILED DESCRIPTION

Figure 1:
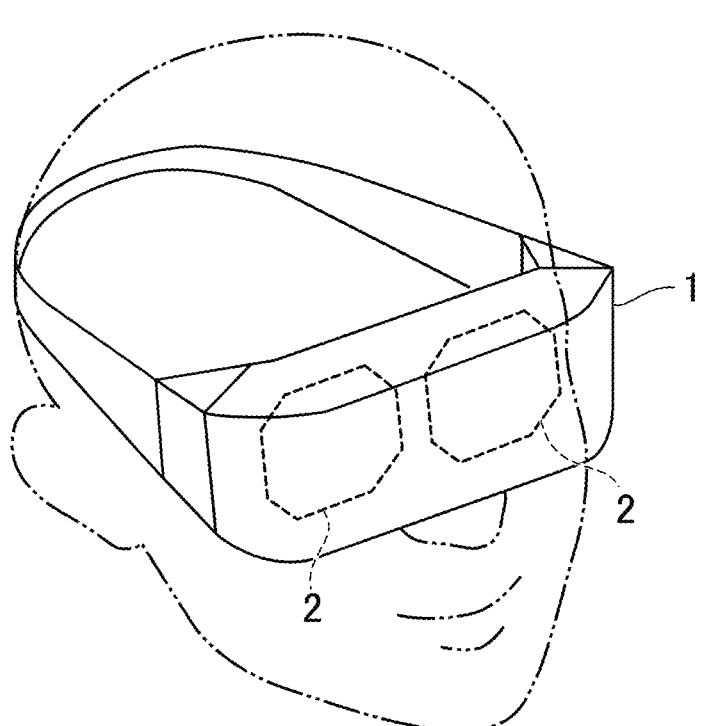
FIG. 1 is a perspective view of a display device according to a first embodiment.

Hereinafter, some embodiments will be described with reference to the drawings. Here, the invention can be embodied according to various aspects within the scope of the invention without departing from the gist of the invention and is not construed as being limited to the content described in the embodiments exemplified below.

The drawings are further schematically illustrated in widths, thickness, shapes, and the like of units than actual forms to further clarify description in some cases but are merely examples and do not limit interpretation of the invention. In the present specification and the drawings, the same reference numerals are given to elements having the same functions described in the previously described drawings, and the repeated description will be omitted.

Further, in the detailed description, "on" or "under" in definition of positional relations of certain constituents, and other constituents includes not only a case in which a constituent is located just on or just under a certain constituent but also a case in which another constituent is interposed between constituents unless otherwise mentioned.

First Embodiment

FIG. 1 is a perspective view of a display device 1 according to a first embodiment. The display device 1 is a head-mounted display that can be worn on the head like goggles or glasses, allowing the user to enjoy virtual reality (VR). The display region 2 is, for example, octagonal.

Figure 2:
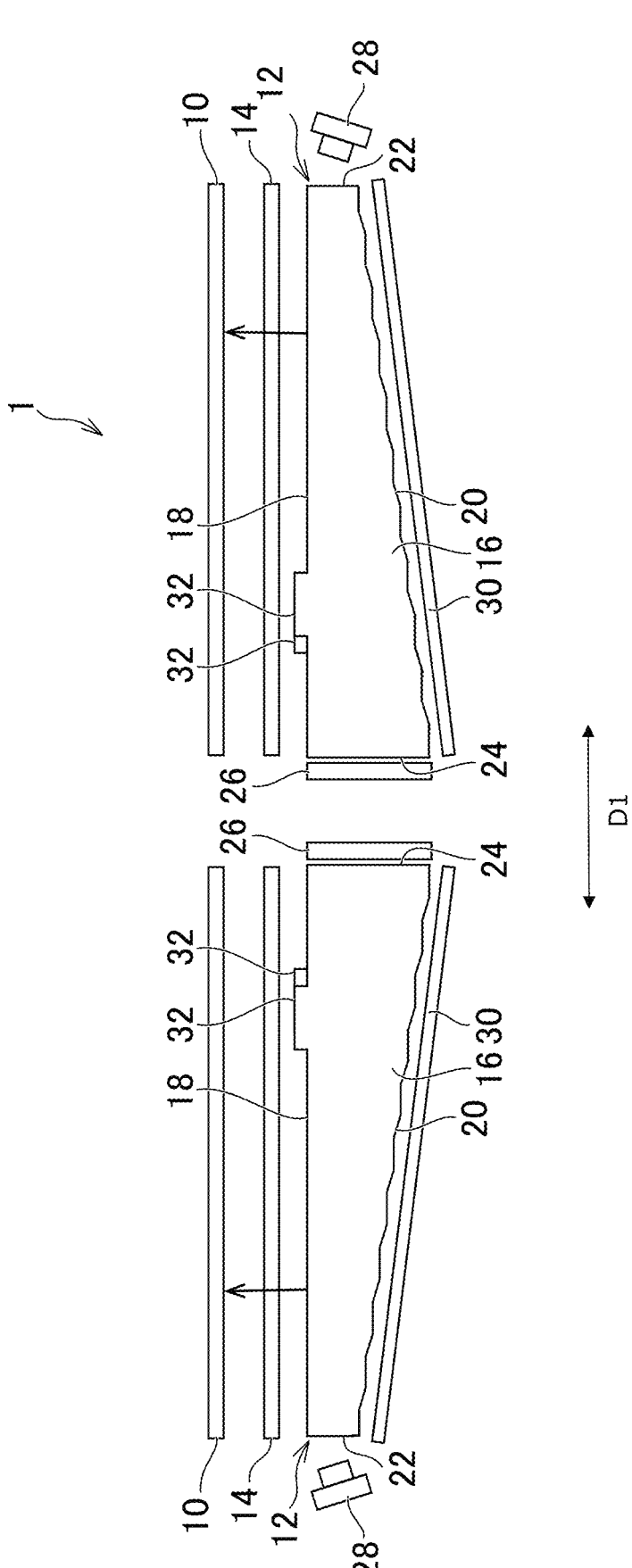
FIG. 2 is a schematic cross-sectional view of the display device shown in FIG. 1.

FIG. 2 is a schematic cross-sectional view of the display device 1 shown in FIG. 1. The display device 1 includes a display panel 10 (e.g., liquid crystal display panel). The left and right display panels 10 are intended for both eyes. A backlight 12 is positioned behind the display panel 10. An optical sheet 14 is interposed between the display panel 10 and the backlight 12.

The backlight 12 includes a light guide plate 16. Its material is an acrylic resin, with a refractive index of, for example, 1.492 to 1.496. The light guide plate 16 includes a front surface 18 and a rear surface 20. The display panel 10 faces the front surface 18. The light guide plate 16 includes a first end face 22 that connects one end of the front surface 18 and one end of the rear surface 20. The light guide plate 16 includes a second end face 24 that connects another end of the front surface 18 and another end of the rear surface 20. The thickness between the front surface 18 and the rear surface 20 is greater at the second end face 24 than at the first end face 22. The rear surface 20 slopes relative to the front surface 18. A reflector 26 faces the second end face 24. A pair of light guide plates 16 are symmetrically arranged.

The backlight 12 includes a laser 28. The laser 28 can emit laser light (e.g., polarized light) toward the first end face 22 of the light guide plate 16. The laser light incident on the first end face 22 is reflected off the front surface 18, the rear surface 20, and the reflector 26, propagates inside the light guide plate 16, and exits from the front surface 18. A reflective sheet 30 is placed under the rear surface 20, reflecting the light that has passed through the rear surface 20.

Figure 3:
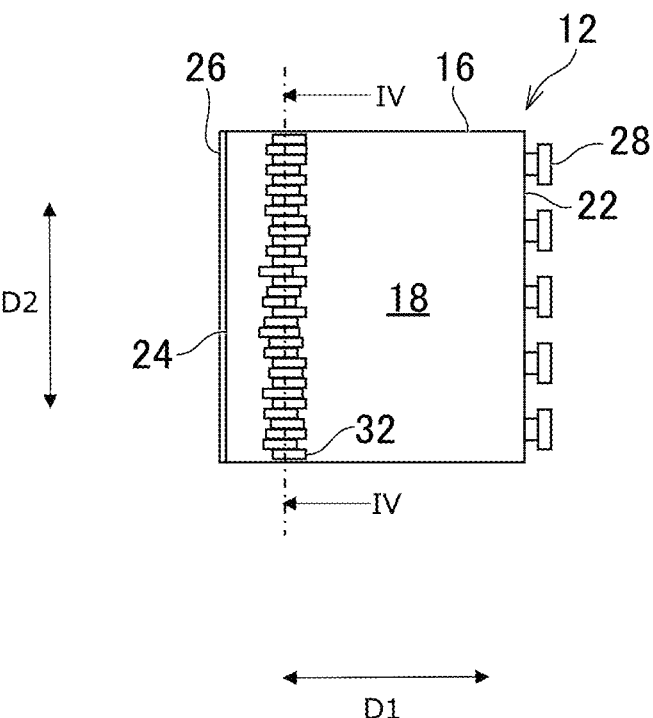
FIG. 3 is a plan view of a backlight shown in FIG. 2.
Figure 4:
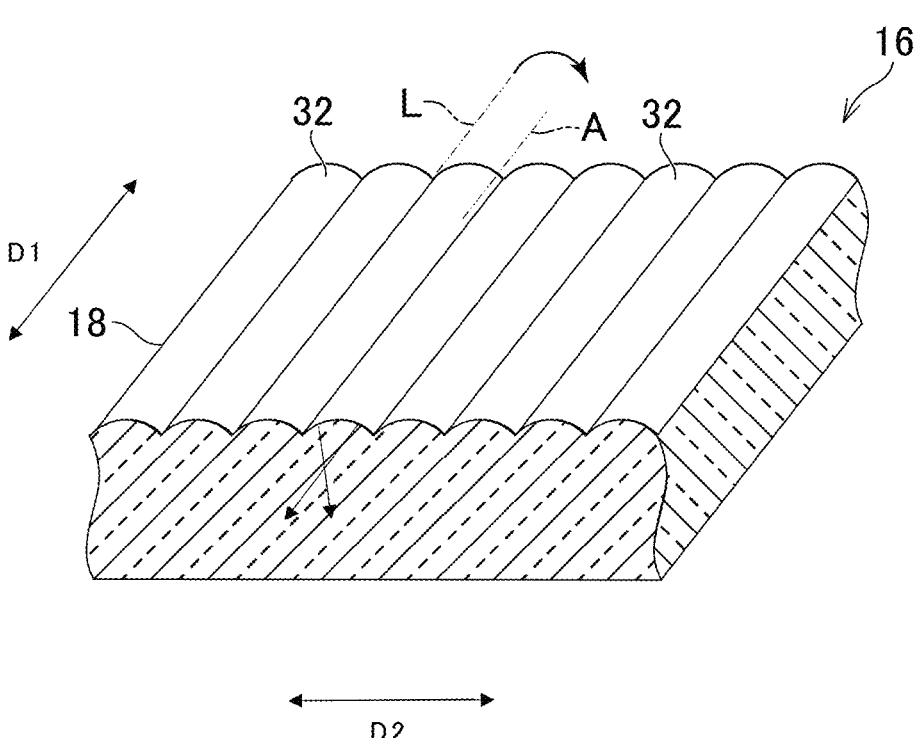
FIG. 4 is a cross-sectional view taken along line IV-IV of a light guide plate in FIG. 3.

FIG. 3 is a plan view of the backlight 12 shown in FIG. 2. FIG. 4 is a cross-sectional view taken along line IV-IV of the light guide plate 16 shown in FIG. 3. The front surface 18 includes line sections 32 in the area where the laser light is reflected. As shown in FIG. 2, when the laser light is reflected in some regions, the line sections 32 are closer to the second end face 24 than the first end face 22. Each line section 32 has a protruding shape. The line sections 32 extend in the first direction D1, which is a direction between the first end face 22 and the second end face 24. The line sections 32 are adjacent to each other in the second direction D2, which is perpendicular to the first direction D1. Each line section 32 includes a curved surface (e.g., cylindrical surface) formed by moving a straight line L, parallel to an axis A extending in the first direction D1, around the axis A.

The curved surface is a convex curved surface. The laser light is reflected off and diffused by the curved surface.

Each line section 32 has an end face perpendicular to the axis A at its tip. The tips of the adjacent line sections 32 in the first direction D1 are not aligned. The tips are not aligned on either side of the first direction D1.

Figure 5:
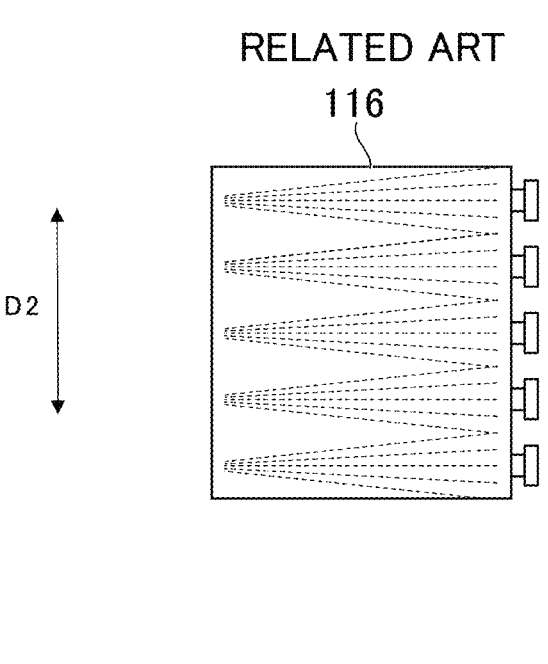
FIG. 5 is a plan view of a backlight according to related art.

FIG. 5 is a plan view of a backlight according to related art. Unlike the present embodiment, the light guide plate 116 does not have line sections. Therefore, due to the linearity of the laser light, a striped pattern appears along the propagation direction of the laser light.

Figure 6:
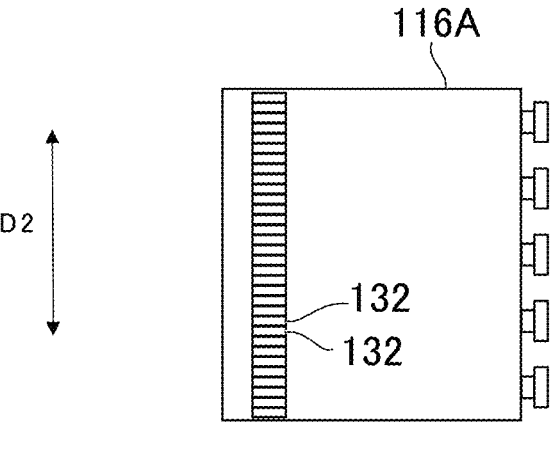
FIG. 6 is a plan view of a backlight according to different related art.
Figure 6:
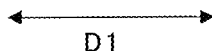

FIG. 6 is a plan view of a backlight according to different related art. Similar to the present embodiment, the light guide plate 116A has line sections 132. Since the laser light is reflected off and diffused by the curved surfaces of the line sections 132, the striped pattern shown in FIG. 5 disappears. However, since the tips of the adjacent line sections 132 are aligned, luminance non-uniformity can be seen along the tips. In contrast, in the present embodiment, as shown in FIG. 3, the tips of the adjacent line sections 32 in the first direction D1 are not aligned, so there is no luminance non-uniformity.

First Modification of First Embodiment

Figure 7:
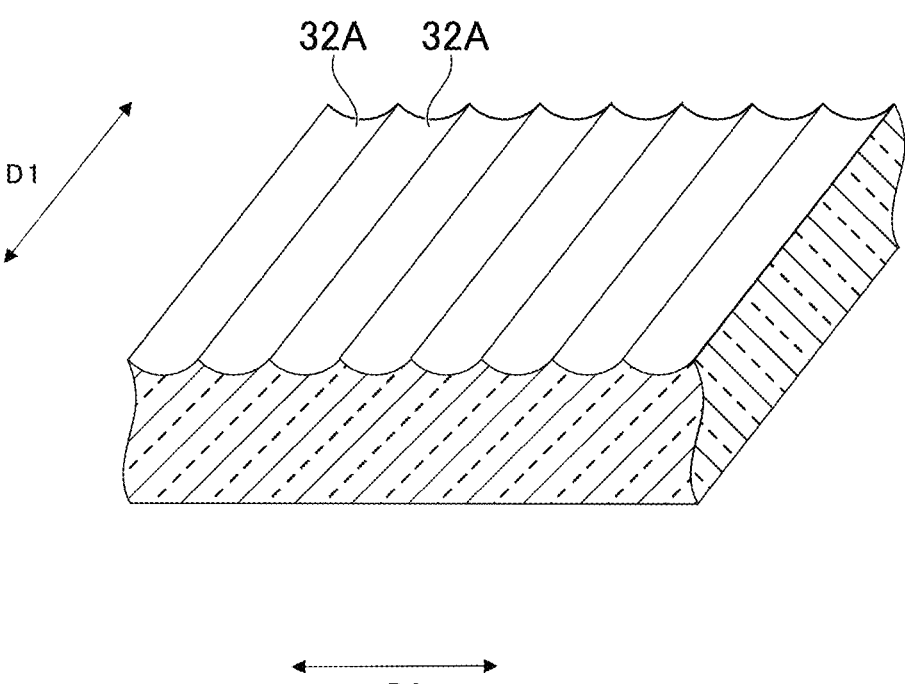
FIG. 7 is a cross-sectional view of a light guide plate according to a first modification of the first embodiment.

FIG. 7 is a cross-sectional view of the light guide plate according to the first modification of the first embodiment. The curved surface of the line section 32A is a concave curved surface. In other words, the line section 32A of this modification is an inverted version of the line section 32 of the first embodiment.

Second Modification of First Embodiment

Figure 8:
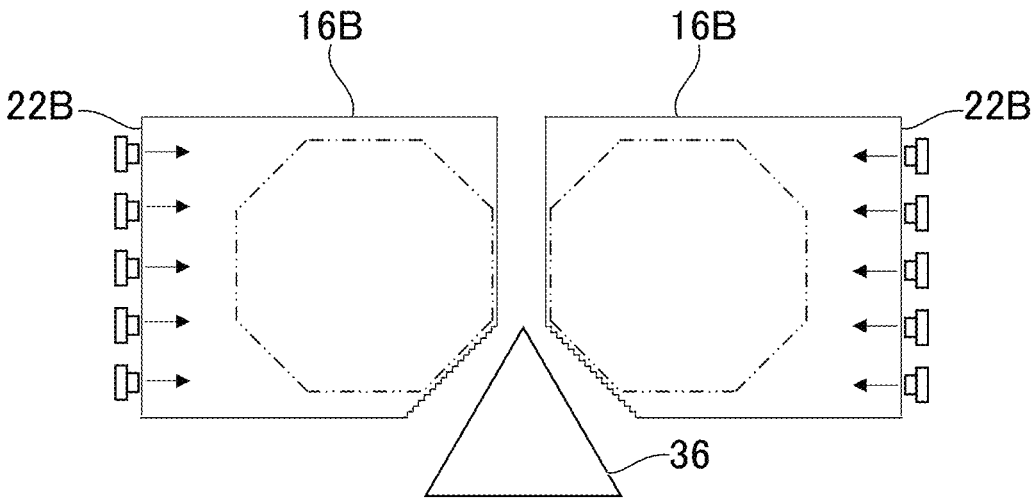
FIG. 8 is a plan view of a backlight according to a second modification of the first embodiment.

FIG. 8 is a plan view of a backlight according to a second modification of the first embodiment. This modification differs from the first embodiment in the planar shape. Specifically, while the light guide plate 16 shown in FIG. 3 is rectangular, the light guide plate 16B in FIG. 8 is pentagonal, with the corners of the rectangle cut off. This can avoid contacting a nose 36 when applied to a head-mounted display. The cut-off end face is jagged, consisting of multiple end faces that are parallel to the first end face 22B but at different distances from the first end face 22B.

Second Embodiment

Figure 9:
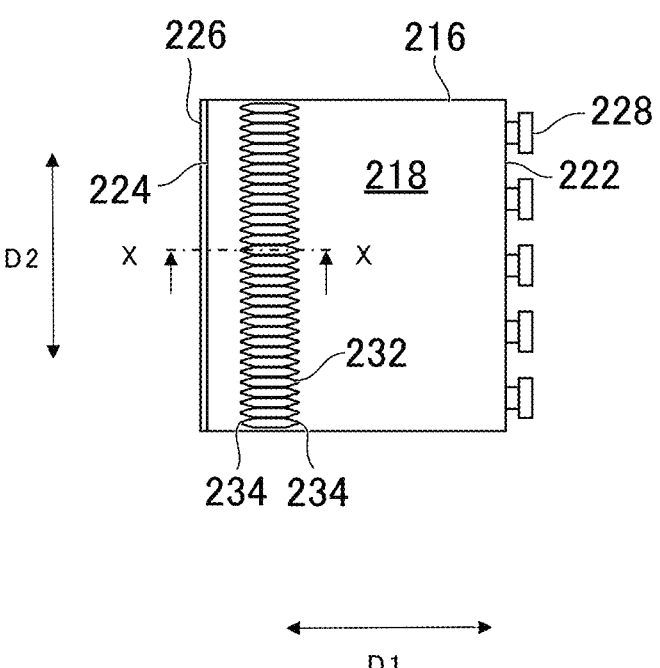
FIG. 9 is a plan view of a backlight according to a second embodiment.
Figure 10:
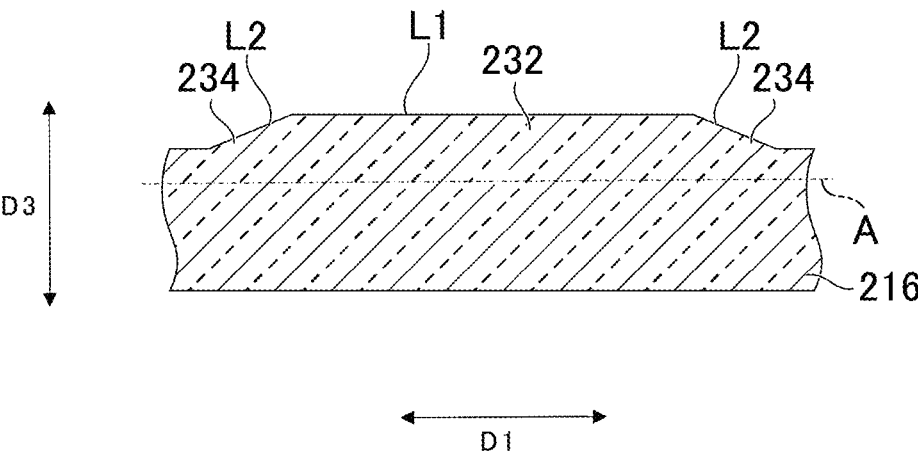
FIG. 10 is a cross-sectional view taken along line X-X of the light guide plate shown in FIG. 9.

FIG. 9 is a plan view of a backlight according to a second embodiment. FIG. 10 is a cross-sectional view taken along line X-X of the light guide plate shown in FIG. 9. The line section 232 includes a curved surface (cylindrical surface) formed by moving a straight line L1, parallel to axis A extending in the first direction D1, around the axis A. The curved surface forms parts of the line section 232 except for the end portion 234.

This embodiment differs from the first embodiment in the shape of the end portion 234 (e.g., both end portions) of each line section 232. The end portion 234 of each line section 232 tapers. The end portion 234 tapers on either side in the first direction D1. The end portion 234 tapers in width in the second direction D2. The end portion 234 tapers in height in the third direction D3, which is perpendicular to both the first direction D1 and the second direction D2. The end portion 234 includes a curved surface (conical surface) formed by moving a straight line L2, not parallel to the axis A extending in the first direction D1, around the axis A. The end portion 234 is composed of a convex curved surface. Other details can be applied from the first embodiment.

First Modification of Second Embodiment

Figure 11:
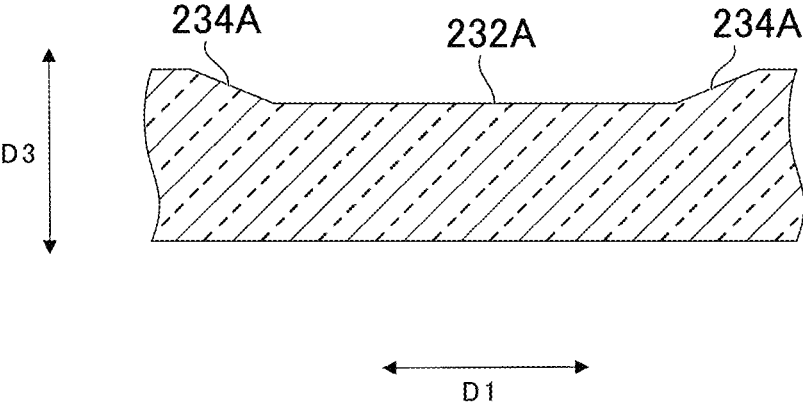
FIG. 11 is a cross-sectional view of a light guide plate according to a first modification of the second embodiment.

FIG. 11 is a cross-sectional view of a light guide plate according to a first modification of the second embodiment. Each line section 232A has a recessed shape. The end portion 234A of each line section 232A is composed of a concave curved surface. In other words, the line section 232A of this modification is an inverted version of the line section 232 of the second embodiment.

Second Modification of Second Embodiment

Figure 12:
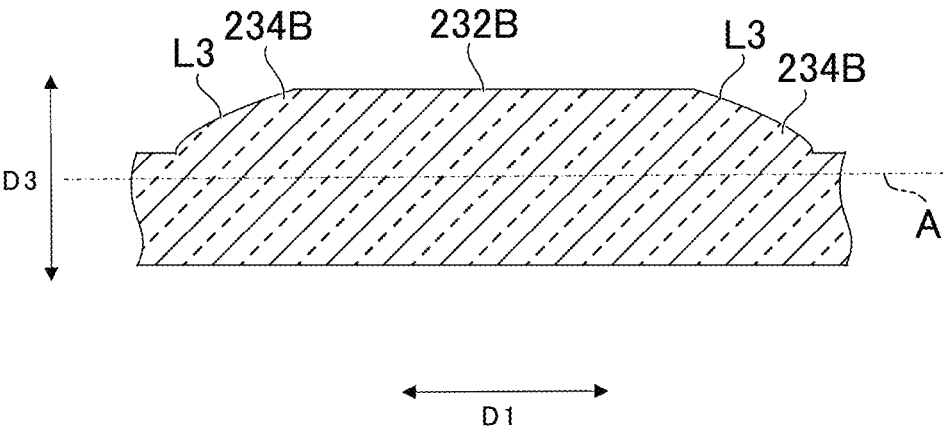
FIG. 12 is a cross-sectional view of a light guide plate according to a second modification of the second embodiment.
Figure 13:
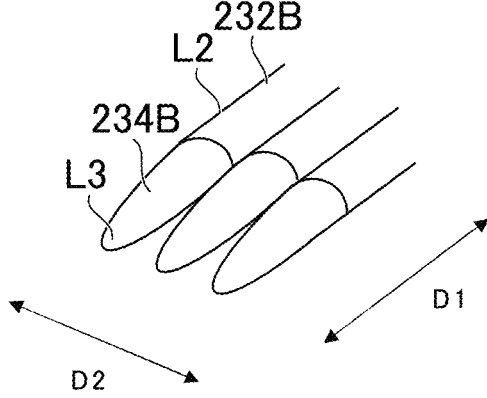
FIG. 13 is a perspective view of a line section shown in FIG. 12.

FIG. 12 is a cross-sectional view of a light guide plate according to a second modification of the second embodiment. FIG. 13 is a perspective view of the line section shown in FIG. 12. In this modification, the end portion 234B of the line section 232B is a curved surface formed by moving a curved line L3, not parallel to the axis A extending in the first direction D1, around the axis A.

The embodiments described above are not limited and different variations are possible. The structures explained in the embodiments may be replaced with substantially the same structures and other structures that can achieve the same effect or the same objective.

Outline of the Embodiment (1) A backlight 12 including: a light guide plate 16 having a front surface 18 and a rear surface 20, the light guide plate 16 having a first end face 22 connecting one end of the front surface 18 and one end of the rear surface 20, the light guide plate 16 having a second end face 24 connecting another end of the front surface 18 and another end of the rear surface 20, a thickness between the front surface 18 and the rear surface 20 being greater at the second end face 24 than at the first end face 22, the rear surface 20 sloping relative to the front surface 18; a laser 28 capable of emitting laser light toward the first end face 22 of the light guide plate 16; and a reflector 26 facing the second end face 24, the laser light incident on the first end face 22 being reflected off the front surface 18, the rear surface 20, and the reflector 26, propagating inside the light guide plate 16, and exiting from the front surface 18, the front surface 18 having line sections 32 each in a protruding shape or a recessed shape in a region where the laser light is reflected, the line sections 32 extending in a first direction D1 that is a direction between the first end face 22 and the second end face 24, and being adjacent in a second direction D2 perpendicular to the first direction D1, each of the line sections 32 having a curved surface formed by moving a straight line L, parallel to an axis A extending in the first direction D1, around the axis A, an adjacent pair of the line sections 32 having respective tips in the first direction D1 that are not aligned with each other.

The line sections 32 eliminate a striped pattern along the direction of laser light propagation. Additionally, since the tips of adjacent line sections 32 are not aligned, there is no luminance non-uniformity.

(2) The backlight 12 according to (1), wherein the tips are not aligned with each other on either side in the first direction D1.

(3) The backlight 12 according to (1) or (2), wherein each of the line sections 32 comprises an end face perpendicular to the axis A.

(4) The backlight 12 according to any one of (1) to (3), wherein each of the line sections 32 is in the protruding shape, and the curved surface is a convex curved surface.

(5) The backlight according to any one of (1) to (3), wherein each of the line sections 32A is in the recessed shape, and the curved surface is a concave curved surface.

(6) A backlight including: a light guide plate 216 having a front surface 218 and a rear surface 220, the light guide plate 216 having a first end face 222 connecting one end of the front surface 218 and one end of the rear surface 220, the light guide plate 216 having a second end face 224 connecting another end of the front surface 218 and another end of the rear surface 220, a thickness between the front surface 218 and the rear surface 220 being greater at the second end face 224 than at the first end face 222, the rear surface 220 sloping relative to the front surface 218; a laser 228 capable of emitting laser light toward the first end face 222 of the light guide plate 216; and a reflector 226 facing the second end face 224, the laser light incident on the first end face 222 being reflected off the front surface 218, the rear surface 220, and the reflector 226, propagating inside the light guide plate 216, and exiting from the front surface 218, the front surface 218 having line sections 232 each in a protruding shape or a recessed shape in a region where the laser light is reflected, the line sections 232 extending in a first direction D1 that is a direction between the first end face 222 and the second end face 224, and being adjacent in a second direction D2 perpendicular to the first direction D1, each of the line sections 232 having a curved surface formed by moving a straight line L, parallel to an axis A extending in the first direction D1, around the axis A, each of the line sections 232 having an end portion 234 that tapers.

(7) The backlight according to (6), wherein the end portion 234 tapers on either side in the first direction D1.

(8) The backlight according to (6) or (7), wherein the end portion 234 tapers in width of the second direction D2.

(9) The backlight according to any one of (6) to (8), wherein the end portion 234 tapers in height of a third direction D3 perpendicular to the first direction D1 and the second direction D2.

(10) The backlight according to any one of (6) to (9), wherein each of the line sections 232 is in the protruding shape, and the end portion 234 comprises a convex curved surface.

(11) The backlight according to any one of (6) to (9), wherein each of the line sections 232A is in the recessed shape, and the end portion 234A comprises a concave curved surface.

(12) A display device 1 including: the backlight 12 according to any one of (1) to (11); and a display panel 10 arranged facing the front surface 18 of the light guide plate 16.

What is claimed is:

1. A backlight comprising:

a light guide plate comprising a front surface and a rear surface, the light guide plate comprising a first end face connecting one end of the front surface and one end of the rear surface, the light guide plate comprising a second end face connecting another end of the front surface and another end of the rear surface, a thickness between the front surface and the rear surface being greater at the second end face than at the first end face, the rear surface sloping relative to the front surface;

a light source capable of emitting laser light toward the first end face of the light guide plate;

a reflector facing the second end face, the laser light incident on the first end face being reflected off the front surface, the rear surface, and the reflector, propagating inside the light guide plate, and exiting from the front surface; and a plurality of line sections each in a protruding shape or a recessed shape, the line sections provided on the front surface in a region where the laser light is reflected, the line sections extending in a first direction that is a direction between the first end face and the second end face, and being adjacent in a second direction perpendicular to the first direction, each of the line sections comprising a curved surface formed by moving a straight line, parallel to an axis extending in the first direction, around the axis,

8 an adjacent pair of the line sections comprising respective tips in the first direction that are not aligned with each other.

2. The backlight according to claim 1, wherein the tips are not aligned with each other on either side in the first direction.

3. The backlight according to claim 1, wherein each of the line sections comprises an end face perpendicular to the axis.

4. The backlight according to claim 1, wherein each of the line sections is in the protruding shape, and the curved surface is a convex curved surface.

5. The backlight according to claim 1, wherein each of the line sections is in the recessed shape, and the curved surface is a concave curved surface.

6. A display device comprising:

the backlight according to claim 1; and a display panel arranged facing the front surface of the light guide plate.

* * * * *